(12) United States Patent
Sakurai et al.

(10) Patent No.: US 6,780,385 B2
(45) Date of Patent: Aug. 24, 2004

(54) METHOD FOR TREATING A GAS

(75) Inventors: Shigeru Sakurai, Fukuoka (JP); Yoichi Mori, Fukuoka (JP); Hachiro Hirano, Tokyo (JP); Makoto Yoshida, Tokyo (JP); Hiroaki Noda, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 196 days.

(21) Appl. No.: 09/858,923

(22) Filed: May 17, 2001

(65) Prior Publication Data

US 2002/0001556 A1 Jan. 3, 2002

(30) Foreign Application Priority Data

May 17, 2000 (JP) ........................................ 2000-145537

(51) Int. Cl.[7] ............................................. C01B 17/96
(52) U.S. Cl. .................................................. 423/244.08
(58) Field of Search ....................... 423/244.01, 244.07, 423/244.08, 421

(56) References Cited

U.S. PATENT DOCUMENTS

| | | | |
|---|---|---|---|
| 4,908,195 A | * | 3/1990 | Wanner et al. ............... 423/237 |
| 5,002,741 A | * | 3/1991 | Hooper ........................ 423/239 |
| 5,160,547 A | | 11/1992 | Kirschner et al. ............. 134/7 |
| 6,042,032 A | * | 3/2000 | Pinoncely ................... 241/24.1 |
| 6,180,074 B1 | | 1/2001 | Fourcout et al. ............ 423/210 |
| 2002/0054846 A1 | * | 5/2002 | Fagiolini et al. ............ 423/267 |

FOREIGN PATENT DOCUMENTS

| | | |
|---|---|---|
| EP | 1 004 345 A2 | 5/2000 |
| JP | 11-104439 | 4/1999 |
| WO | WO 97/02885 | 1/1997 |
| WO | WO 97/16376 | 5/1997 |

OTHER PUBLICATIONS

7 Page Product Brochure Titled "Mikro ACM Grinding Systems" Published by the Hosokawa Micron Company., no date.*
Kohl et al. *Gas Purification* (5th Ed.) by the Gulf Publishing Co USA, ISBN 0–88415–220–0, pp. 624–626., 1997.*
Kroschwitz et al. *Kirk–Othmer Encyclopedia of Chemical Technology* (4th Ed.) vol. 7, John Wiley & Sons, Inc. ISBN 0–471–52675–4 (v. 7), pp. 1044, 1045, and 1052., 1993.*
Elvers (editors) et al. Ullmann's Encyclopedia of Industrial Chemistry (5th, Completely Revised Edition), vol. A24, VCH.*
Uerlagsgesellschaft mbH, Weinheim (Fed. Rep. Germany) ISBN 0–89573–174–6, pp. 313–314., 1993.*
Read Industrial Chemistry 3rd Ed. John Wiley and Sons, Inc. USA pp. 201–202., 1943.*

* cited by examiner

*Primary Examiner*—Wayne A. Langel
(74) *Attorney, Agent, or Firm*—Oblon, Spivak, McClelland, Maier & Neustadt, P.C.

(57) ABSTRACT

A method for treating a gas containing a $SO_3$ component, which comprises adding a sodium carbonate powder having a mean particle diameter of at most 20 $\mu$m to the gas to remove the $SO_3$ component from the gas.

27 Claims, 1 Drawing Sheet

METHOD FOR TREATING A GAS

The present invention relates to a method for treating a gas to neutralize a $SO_3$ component contained in e.g. a gas generated by combustion of a fuel containing a sulfur content by e.g. a boiler, inexpensively, efficiently, simply and safely without using a large scale installation.

When a fuel containing a sulfur content represented by heavy oil, coal or coke, is burned, or when a raw material containing sulfur, such as an iron ore, is burned, $SO_3$ or $H_2SO_4$ will be contained in the exhaust gas, thus causing corrosion of an apparatus or air pollution. $SO_3$ or $H_2SO_4$ will react with water vapor contained in the exhaust gas to form a sulfuric acid mist, which causes a white smoke, a purple smoke, a brown smoke or a black smoke (hereinafter referred to as a purple smoke, as a general term including a hardly extinguishable white smoke). The sulfuric acid mist which turns into such a purple smoke, will present a damage to a human body or an animal or plant at the falling site. Further, the ash dust deposited in a flue, etc., is likely to be discharged as acid smut containing sulfuric acid substantially due to e.g. a load change, thus leading to a problem of deteriorating the environment in the form of an acid dustfall.

Accordingly, in order to remove $SO_3$, $H_2SO_4$ and a sulfuric acid mist (in this specification, these may generally be referred to as a $SO_3$ component), a method has heretofore been employed wherein a slurry having e.g. an oxide or hydroxide of calcium or magnesium dispersed in an organic solvent, is preliminarily added to the fuel to prevent formation of the $SO_3$ component, or wherein such a slurry is added to a gas after the combustion to neutralize the $SO_3$ component. However, with such methods, the additives are likely to deposit on a heat exchanger in the boiler, and when a large amount of the additives deposit thereon, the operation of the boiler will be hindered, and accordingly, it is difficult to use the additives in a large amount.

Further, to actively neutralize $SO_3$ in a flue, a method has been employed wherein a powder of e.g. calcium hydroxide, magnesium oxide or magnesium hydroxide or a slurry having such a powder dispersed in water, is injected to the flue after the exhaust gas has passed through an air preheater. However, in the case where the powder itself is injected by this method, as the fine powder poor in flowability is injected by means of e.g. a screw feeder, volumetric feeding will be poor, and no stable effect is likely to be obtainable. Further, such a powder is likely to agglomerate, and it is hardly uniformly dispersible and its effect as a neutralizing agent is low. Furthermore, in the case of injecting it in the form of a slurry, the powder contained in the slurry is likely to deposit on and clog the transportation line for injecting the slurry, whereby it is difficult to use it stably at a constant amount.

Further, in the case of using e.g. magnesium oxide, since magnesium oxide has a low reaction efficiency, it is necessary to add an excessive amount of a magnesium oxide powder. In such a case, unreacted magnesium oxide will remain in the flue, and the magnesium oxide may cause problems in dumping, since magnesium oxide has a low solubility in water. Further, it is difficult to keep the amount of injection to be constant, since the powder is fine and has a poor flowability.

On the other hand, a method of injecting ammonia to the flue, may be mentioned. However, there are restrictions relating to handling of e.g. a high-pressure gas and problems relating to the storage temperature, and further, an additional large scale installation is required. Further, when the $SO_3$ component is removed by ammonia, if an adequate injection amount is not maintained, an ammonium hydrogen sulfate will form. If the ammonium hydrogen sulfate is deposited on the apparatus, it will cause a trouble. Accordingly, ammonia is required to be injected excessively, and if the excessive ammonia is released in the atmospheric air, such will be problematic from the viewpoint of the environment safety.

Further, it is required to remove a $SO_3$ component also in the treatment of an exhaust gas of combustion of a waste liquid, a waste oil, a waste gas or a solid waste in e.g. steel manufacturing, iron manufacturing, nonferrous metal refining, glass melting, manufacturing of sulfuric acid or manufacturing surfactant, and an efficient and safe neutralizing treatment method for the $SO_3$ component, is desired.

It is an object of the present invention to provide a method for removing a $SO_3$ component from a gas containing the $SO_3$ component, efficiently, simply and safely.

The present invention provides a method for treating a gas containing a $SO_3$ component, which comprises adding a sodium carbonate powder having a mean particle diameter of at most 20 $\mu$m to the gas to remove the $SO_3$ component from the gas.

BRIEF DESCRIPTION OF THE DRAWINGS

In the accompanying drawing.

DETAILED DESCRIPTION OF THE INVENTION

Figure 1:
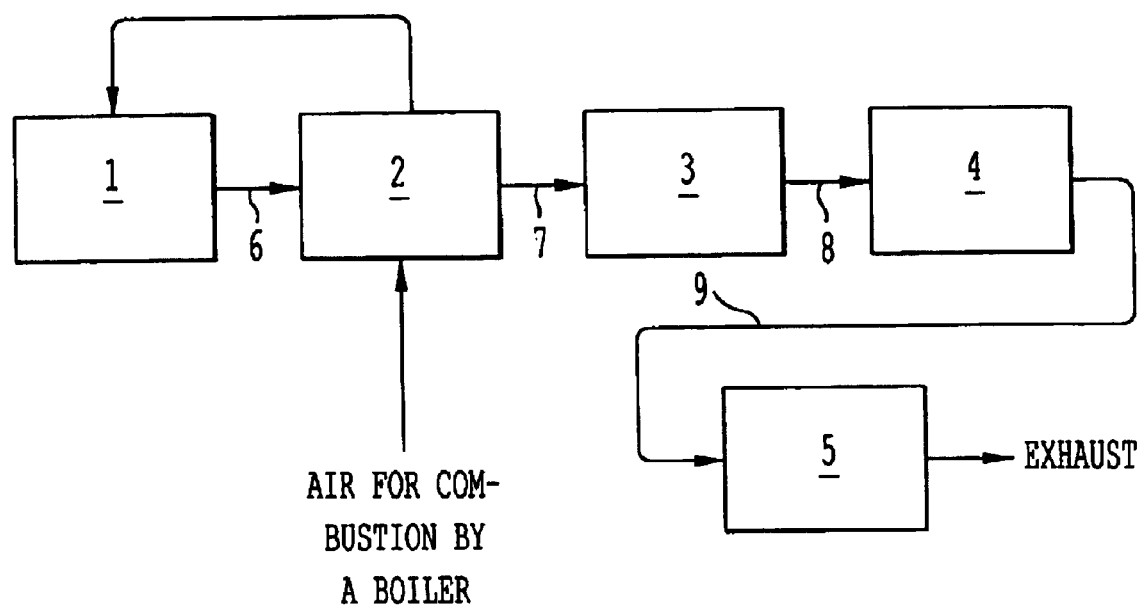
FIG. 1 is a flow chart showing a method for treating an exhaust gas from the combustion by a boiler.

Now, the present invention will be described in detail with reference to the preferred embodiments.

In the present invention, when the sodium carbonate powder is added as sprayed and dispersed in a gas at the dew point or higher of the acid (the $SO_3$ component), it captures the gaseous $SO_3$ component mainly by a diffusion mechanism and neutralizes and removes such a component.

In the present invention, the mean particle diameter of the sodium carbonate powder is at most 20 $\mu$m, preferably at most 15 $\mu$m, particularly preferably at most 10 $\mu$m. Sodium carbonate having a mean particle diameter of at most 20 $\mu$m has a high reactivity with the $SO_3$ component, since the specific surface area of the particles themselves is large. The smaller the mean particle diameter of sodium carbonate, the better, since the reaction with the $SO_3$ component is quick, and its lower limit is not particularly limited from the viewpoint of the effect for removing the $SO_3$ component, but it is preferably at least 1 $\mu$m from the viewpoint of the cost required for pulverization of the powder and difficulty in handling of a fine powder. Further, to sodium carbonate, sodium hydrogencarbonate may be mixed for use.

In the present invention, it is preferred to increase the specific surface area of sodium carbonate in order to increase the reaction rate with the $SO_3$ component. For this purpose, a method of increasing the specific surface area by finely pulverizing sodium carbonate, may be employed. Further, if sodium hydrogencarbonate is calcinated, it will turn into porous sodium carbonate so-called light ash, while its shape is substantially maintained. It is preferred to use such light ash, since it is effective for the reaction with the gas, as its specific surface area is larger than the one simply pulverized to have the same mean particle diameter. Further, in such a case, it is preferred for the prevention of global warming to recover carbon dioxide gas which is generated at the time of baking sodium hydrogencarbonate.

On the other hand, sodium carbonate which is usually called dense ash, is one obtained by baking sodium carbonate monohydrate and is not porous like the above-mentioned light ash, and its specific surface area is small. When comparison is made with respect to the specific surface area, in the case of products manufactured by ASAHI GLASS CO., LTD, for example, a light ash having a mean particle diameter of 7 μm has a specific surface area of 2.7 m²/g, whereas a dense ash having a mean particle diameter of 6 μm has a specific surface area of 1.1 m²/g. The light ash is bulky as a powder as compared with the dense ash. However, if pulverized to have a mean particle diameter of at most 20 μm, the dense ash may also suitably be used for the process of the present invention although the performance may be poor to some extent as compared with the light ash. Sodium carbonate is usually available in the form of a dense ash, and the dense ash has merits in that it is inexpensive and readily available.

In the present invention, potassium carbonate may also be used instead of sodium carbonate. Potassium carbonate may also be obtained by baking potassium hydrogencarbonate in the same manner as sodium carbonate. However, as compared with sodium carbonate, it will be industrially of high costs. Potassium carbonate is useful, for example, in a case where it is desired to avoid contamination of sodium, for example, in a case where a gas is to be purified.

The sodium carbonate powder to be added into a gas to be treated, preferably has an angle of repose of at most 65°, particularly preferably at most 60°, as a powder characteristic value. A sodium carbonate powder having an angle of repose within this range, is excellent in flowability and can, for example, maintain a good condition of spraying in a case where it is sprayed into a flue, and further, discharge from a storage tank or air transportation is, for example, easy, whereby it efficiently reacts with $SO_3$. Therefore, the spray amount of sodium carbonate can be reduced, and handling as a powder will be easy. The angle of repose of the sodium carbonate powder in this specification, means an angle of repose of the entire powder (the mixture) to be added to the gas after adding an anti-caking agent or coarse particles to sodium carbonate, as will be described hereinafter.

The sodium carbonate powder is preferably added in an amount of from 0.5 to 8 mols, particularly preferably from 2 to 5 mols, per mol of the $SO_3$ component contained in the gas. If the amount to be added is less than 0.5 mol, the $SO_3$ component may not adequately be removed, and the effect for removing a purple smoke tends to be inadequate. Further, if the amount exceeds 8 mols, such is unnecessary from the viewpoint of the efficiency for removing the $SO_3$ component, and such is waste from the viewpoint of costs.

In the present invention, it is possible to remove the $SO_3$ component selectively from a gas containing a small amount of $SO_3$ at a level of 20 vol. ppm in a gas containing a high concentration of $SO_2$ exceeding 500 vol. ppm or even exceeding 1000 vol. ppm.

In the present invention, sodium carbonate is used, and as compared with ammonia which is regulated as a poisonous and deleterious substance and restricted in its handling as a high pressure gas or sodium hydroxide which is a deleterious substance, a worker can safely handle sodium carbonate. Further, the application can be carried out easily by a simple spray device such as an ejector, and no expensive capital investment is required for the application. In the method of the present invention, the $SO_3$ component is removed by neutralization in the same manner as the conventional method of injecting ammonia, and accordingly, it can readily be substituted.

In the present invention, it is preferred to mix an anti-caking agent to sodium carbonate and add the mixture into the gas in order to efficiently remove the $SO_3$ component in the gas. With sodium carbonate, by the presence of the very small amount of moisture, the particles are likely to agglomerate and cake, whereby the flowability tends to be poor. Accordingly, if it is stored in a state pulverized to a mean particle diameter is 20 μm or less, it is likely to cake during the storage, or dispersibility at the time of use tends to be low. The anti-caking agent will deposit on the surface of the sodium carbonate particles and will be present between sodium carbonate particles, whereby an effect for preventing agglomeration and caking of the particles of sodium carbonate to one another will be obtained. Accordingly, by adding an anti-caking agent to sodium carbonate, it is possible to suppress agglomeration of sodium carbonate and to maintain high flowability of sodium carbonate, and fine powder of sodium carbonate can be well dispersed in the gas, whereby a high reaction efficiency e.g. a high removal effect of the $SO_3$ component can be maintained.

In the present invention, the anti-caking agent is preferably added in an amount of from 0.1 to 5.0 mass %, particularly preferably from 0.3 to 2.0 mass %, based on sodium carbonate. If the amount is less than 0.1 mass %, the effect for improving the flowability of sodium carbonate tends to be low, such being undesirable. If the amount exceeds 5.0 mass %, the cost increases without no further increase in effects, such being undesirable.

In the present invention, the mean particle diameter of the anti-caking agent is preferably from 0.005 to 5.0 μm, particularly preferably from 0.005 to 2.0 μm. If the mean particle diameter of the anti-caking agent is less than 0.005 μm, the anti-caking effect will not increase, and such a product will not be available as an inexpensive industrial product, such being undesirable. On the other hand, if the mean particle diameter exceeds 5.0 μm, even if the same mass proportion is added as in the case of the fine particles, the anti-caking effect decreases, since the number of particles of the anti-caking agent is small.

As the anti-caking agent, an agent commonly known as a material to be added for the purpose of improving flowability or anti-caking of a powder, such as magnesium carbide, silica, alumina, aluminosilicate, artificial or natural zeolite, a stearate or talc, may be employed, and a plurality of materials may be used as mixed. Among them, silica is preferred, and particularly preferred is fumed silica from the viewpoint of fineness of the mean particle diameter, the anti-caking effect and availability. Further, zeolite may also be preferably used, and it is also preferred to use fumed silica and zeolite in combination.

When fumed silica is used, depending upon the position for injection of sodium carbonate of the apparatus, hydrophilic fumed silica excellent in dispersibility in water, is preferred. In general, fumed silica has hydrophilicity unless it is treated for hydrophobicity. Even hydrophobic fumed silica has an effect for improving flowability of sodium carbonate. However, for example, in the boiler, when sodium carbonate and hydrophobic fumed silica are added at an upstream of an exhaust gas desulfurizer, the hydrophobic fumed silica is likely to agglomerate in an absorption tower of the exhaust gas desulfurizer to form a membrane at the gas-liquid interface, and by the influence of the membrane, the interior of the apparatus will be full of bubbles. Consequently, the bubbles flow out into a flue, and the flow pressure of gas in the absorption tower tends to increase, and the operation tends to be hardly continued, such being undesirable. However, in a case where an electrostatic precipitator is installed between the exhaust gas desulfurizer and the position at which sodium carbonate and the anti-caking agent are added, a trouble such as the above-mentioned bubbles will not result, and the anti-caking agent can be used irrespective of being hydrophobic or hydrophilic.

Other than this, flowability can also be imparted by adding coarse particles to a sodium carbonate powder having a mean particle diameter of at most 20 μm in an amount of from 10 to 50 mass % based on the powder. If the amount is less than 10 mass %, the effect for improving the flowability tends to be low, such being undesirable. If it exceeds 50 mass %, the proportion of the coarse particles tends to be high, whereby the amount of the sodium carbonate powder decreases, and the treating ability tends to decrease, such being undesirable. Here, the coarse particles are specifically a sodium carbonate powder having a mean particle diameter of more than 20 μm, preferably at least 50 μm, and a common commercial product can be used. Further, the coarse particles may be a sodium hydrogencarbonate powder. In the case of sodium hydrogencarbonate coarse particles, after injected into a flue, the coarse particles will be thermally calcinated to form sodium carbonate.

As a method for preventing deterioration of flowability due to agglomeration and solidification of sodium carbonate particles, in addition to the above-mentioned method of adding an anti-caking agent, a method of maintaining a dried state may be mentioned as a storage method after pulverization. Specifically, it is preferred to add a drying agent at the time of storage or to use, as a packaging material, a commercially available dampproofing packaging material. As the drying agent, a substance which is commonly known as a drying agent and which is not reactive with sodium carbonate, such as zeolite, silica gel, etc. may preferably be employed. Further, it is more preferred to use a dampproofing bag as a packaging material to store sodium carbonate with a view to maintaining the effect of adding the anti-caking agent. Here, the dampproofing material bag is meant for a bag made of a packaging material having a moisture permeability of not more than 5 $g/m^2/day$ at 40° C., as stipulated by JIS-Z0208.

In the present invention, a powder of sodium carbonate is added into a gas, preferably together with an anti-caking agent and/or coarse particles, whereby as is different from a case where a slurry having a powder dispersed, is used, the solid is free from precipitation and thus is easy to handle. Further, in a case where an anti-caking agent or coarse particles are added, the flowability is excellent by the action thereof, whereby the apparatus is free from clogging, sodium carbonate can be constantly injected, and the $SO_3$ component can be removed by accurate neutralization constantly. Further, it is supplied in a dry state i.e. not in the form of an aqueous solution, whereby the installation is free from a problem of corrosion, etc., and the equipment management and its operation is easy, and a stabilized operation can be maintained.

In the present invention, at the time of treating the gas, sodium carbonate is pulverized by a dry type pulverizer to a mean particle diameter of at most 20 μm and can be directly added into the gas containing the $SO_3$ component in a state as dispersed in the draft which generated by pulverizer. Sodium carbonate before pulverization preferably has a mean particle diameter of from 0.05 to 0.5 mm. If the mean particle diameter is less than 0.05 mm, stabilized supply to the pulverizer tends to be difficult, such being undesirable, and if it exceeds 0.5 mm, the exorbitance pulverizer is required for pulverization the mean particle diameter of at most 20 μm, such being undesirable. Further, sodium carbonate before pulverization preferably has an angle of repose of at most 55°, particularly preferably at most 50°. If the angle of repose exceeds 55°, stabilized supply to the pulverizer tends to be difficult, such being undesirable.

Further, with respect to the pulverizer, it is preferred to employ a pulverizer integrated with a classifier in order to efficiently pulverize sodium carbonate. As such a classifier, a pneumatic classifier may, for example, be mentioned. As a specific example of such a pulverizer, a high speed impact air classifying mill manufactured by Hosokawa Micron Corporation (tradename: ACM pulverizer) can suitably be employed, since it is integrated with a dry type classifier. Further, the pulverization is preferably carried out to such an extent that the 90% diameter in the cumulative undersize distribution of the neutralizer is at most 50 μm, in order to secure a high reactivity.

By this method wherein sodium carbonate is pulverized by a dry system pulverizer and added into the gas, it is not necessary to store the pulverized sodium carbonate powder, whereby an anti-caking agent may not be added, but an addition of an anti-caking agent is more effective for prevention of agglomeration of sodium carbonate or for improvement of the dispersibility during spraying.

Now, the method of the present invention will be described in detail with reference to FIG. 1 referring to a method for treating an exhaust gas formed by combustion of a fuel by a boiler, as an example. FIG. 1 is a flow chart showing the method for treating an exhaust gas formed by combustion in a boiler.

A high temperature exhaust gas formed by combustion in a boiler 1 is sent through a first flue 6 to an air preheater 2. Here, the exhaust gas is heat exchanged with air for combustion to be sent to the boiler 1, in order to improve the unit requirement of the fuel, whereby the temperature of the air for combustion is raised. Then, the exhaust gas is sent through a second flue 7 to an electrostatic precipitator 3, where a powder dust contained in the exhaust gas is removed by static electricity. Here, instead of the electrostatic precipitator 3, a bag filter may be used, or the electrostatic precipitator 3 may be omitted depending upon the components contained in the exhaust gas. The exhaust gas passed through the electrostatic precipitator 3, is sent to a desulfurizer through a third flue 8, where $SO_2$, etc. will be removed by e.g. a magnesium hydroxide slurry. Then, the exhaust gas is sent to a stack 5 through a fourth flue 9 and exhausted from the stack 5.

Even if the exhaust gas containing the $SO_3$ component is, for example, at such a level of 20 vol. ppm as reduced to $SO_3$ concentration, a phenomenon will appear such that a purple smoke trails from the stack 5. The main cause is considered to be such that the $SO_3$ component contained in the exhaust gas will react with water vapor contained in the gas to form a sulfuric acid mist in the flue and in the desulfurizer 4. Accordingly, formation of the purple smoke can be prevented by removing the $SO_3$ component and the sulfuric acid mist by adding the sodium carbonate powder into the exhaust gas.

In the above process, according to the present invention, the sodium carbonate powder is added into at least one flue between the first flue 6 to the fourth flue 9, and the flue to which the powder is added, is suitably selected depending upon the particular purpose. In the present invention, it is intended to remove the $SO_3$ component, and it is preferred to add the sodium carbonate powder to an upstream flue of the desulfurizer 4, particularly preferably to the third flue 8. The interior of the third flue 8 is certainly maintained at a temperature of at least the dew point of $SO_3$ or $H_2SO_4$ contained in the gas, whereby the efficiency for removing the $SO_3$ component is higher than the fourth flue 9.

Now, the present invention will be described in further detail with reference to Examples. However, it should be understood that the present invention is by no means restricted to such specific Examples.

EXAMPLES

In the following Examples, the mean particle diameter and the 90% diameter (the particle diameter at 90% of cumulative undersize distribution) of sodium carbonate, the angle of repose, the dispersibility and the specific surface area were measured by the following methods.

The mean particle diameter and the 90% diameter in the cumulative undersize distribution of sodium carbonate were measured by a laser diffraction scattering type particle size distribution measuring apparatus (tradename: MICROTRACK FRA9220, manufactured by Nikkiso Co., Ltd.), whereby by cumulation from the fine side based on the volume, the particle diameter corresponding to 50% was taken as the mean particle diameter, and the particle diameter corresponding to 90% was taken as the 90% diameter.

The angle of repose was measured by using Powder Tester Model PT-D, manufactured by Hosokawa Micron Corporation.

The measurement of the angle of repose is carried out, by subjecting the standard sieve having a diameter 80 mm and a sieve opening of 710 $\mu$m to vibration and letting the sample pass through a funnel. And gently dropping the sieved sample from a funnel having an elevation of 160 mm onto a horizontal table having a diameter of 80 mm. The angle of repose is the angle between the horizontal and the slope of a heap (generatrix) of a conelike pile of the powder. Powders with relatively good flowability have a small angle of repose and reproducibility is also good. Powders which have a high adhesion tendency have a high angle of repose, and tend to have poor flowability. See Ralph L. Carr, Jr., "Evaluating Flow Properties of Solids" Chemical Engineering Jan. 18 (1965), pp. 163–168.)

The dispersibility is determined by dropping 10 g powder sample from a height of 61 cm at a stretch onto a watch glass having a diameter of 10 cm installed with the concave side down, as a percentage of the mass of the powder sample scattering outside the watch glass relative to the total mass of the dropped powder sample. This value is also related to the tendency of flooding. A powder which have a high numerical value of dispersibility tend to have high floodability. Further, to confirm the discharge state, with respect to this powder sample, the time (the discharge time) required for the discharge of all of 10 g of the powder sample, was measured in the same manner as the method for measuring the angle of repose.

The specific surface area was measured by a BET simplified method (tradename: Rapid Surface Area Apparatus SA-1000) manufactured by Scientific Technology LTD.

Example 1

A test was carried out by using an exhaust gas formed by combustion of a fuel by a real boiler of a power plant, to confirm the effect for removing the $SO_3$ component in the gas by an addition of sodium carbonate.

Here, the wakeup of the installation was one having an electrostatic precipitator 3 and a second flue 7 removed from FIG. 1, and sodium carbonate was injected into the third flue 8.

Specifically, in the following process, the exhaust gas was treated in the third flue 8 between the air preheater 2 and the desulfurizer 4. The waste gas treatment was carried out in such a manner that hydrophilic fumed silica having a mean particle diameter of 0.01 $\mu$m was added to a sodium carbonate powder having a mean particle diameter of 7 $\mu$m, a specific surface area of 2.7 $m^2/g$ and an angle of repose of 51° in an amount of 1.0 mass % based on the sodium carbonate powder, to obtain a mixture, which was added with agitating by air in an amount as identified in Table 1. The results are shown in Table 1.

Sodium carbonate used here, is one obtained by finely pulverizing light ash manufactured by ASAHI GLASS CO., LTD. (porous sodium carbonate obtained by calcinating sodium hydrogencarbonate formed in the course of a process for producing sodium carbonate by an ammonia soda process). Further, visual observation of a plume of a purple smoke caused by a sulfuric acid mist discharged from the stack 5 and quantitative analysis of the $SO_3$ component in the fourth flue 9, were carried out and evaluated. For the purpose of comparison, a case wherein no sodium carbonate powder was added, is disclosed in the Table.

Further, the amount of sodium carbonate in the Table is represented by the mole ratio to the $SO_3$ component contained in the exhaust gas prior to being sent to the desulfurizer 4 (prior to the formation of a sulfuric acid mist in contact with steam). Further, the temperature of the gas in the third flue 8 between the air preheater 2 and the desulfurizer 4, was 158° C.

Process: A high temperature exhaust gas formed by combustion in the boiler was sent to the air preheater 2 through the first flue 6 and heat-exchanged with the air for combustion. Then, the exhaust gas was sent to the desulfurizer 4 through the third flue 8, where $SO_2$, etc. were removed by a magnesium hydroxide slurry. Then, it was sent to the stack 5 through the fourth flue 9 and discharged from the stack 5.

The specifications of the boiler in operation and the exhaust gas composition were as follows.
Specifications of the Boiler
Type: Benson Boiler (forced once-through type boiler), amount of steam generation: 83 t/hr, temperature of the steam: 520° C., pressure of the steam: 13.7 MPa.
Exhaust Gas Composition
$O_2$: 4.5 vol %, $SO_2$: 1400 vol. ppm, concentration of the $SO_3$ component reduced to $SO_3$ concentration: 17 vol. ppm.

TABLE 1

| Amount of sodium carbonate | Analytical value of the $SO_3$ component | Plume length | Plume concentration |
|---|---|---|---|
| Nil | 17 ppm | About 300 m | (Standard) |
| 0.8 time by mol ratio | 4 ppm | About 200 m | About a half of the standard |
| 1.6 times by mol ratio | 2 ppm | Less than 10 m | Hardly visible |
| 3.2 times by mol ratio | 1 ppm | Not observed | Not observed |

Further, the behavior if $SO_2$ was recorded by a continuous automatic analyzer after the injected point of sodium carbonate in the third flue 8, whereby the concentration was always at a level of 1400 vol. ppm, and no change was observed. This indicates that the present invention is effective as a method for selectively removing the $SO_3$ component from a gas wherein the $SO_3$ gas is contained in a small amount in the highly concentrated $SO_2$ gas.

Example 2

The same test as in Example 1 was carried out on the same day in the same manner as in Example 1 except that sodium carbonate having a mean particle diameter of 6 μm, a specific surface area of 1.1 m²/g and an angle of repose of 50°, obtained by finely pulverizing dense ash manufactured by ASAHI GLASS CO., LTD, was used. The results are shown in Table 2. The behavior of $SO_2$ was recorded by a continuous automatic analyzer after the injected point of sodium carbonate in the second flue 7, whereby the concentration was always at a level of 1400 vol. ppm, and no change was observed. Although the effect was slightly lower than the results in Example 1, it was confirmed that the $SO_3$ component can selectively be removed in a high concentration of $SO_2$, and this method is industrially useful.

TABLE 2

| Amount of sodium carbonate | Analytical value of the $SO_3$ component | Plume length | Plume concentration |
| --- | --- | --- | --- |
| Nil | 17 ppm | About 300 m | (Standard) |
| 0.8 time by mol ratio | 8 ppm | About 250 m | About 70% of the standard |
| 1.6 times by mol ratio | 3 ppm | Less than 20 m | Hardly visible |
| 3.2 times by mol ratio | 2 ppm | Not observed | Not observed |

Example 3

Comparative Example

A test was carried out in the same manner as in Example 1 except that sodium carbonate (light ash) having a mean particle diameter of 25 μm, an angle of repose of 49° and a specific surface area of 1.9 m²/g, was used instead of the sodium carbonate having a mean particle diameter of 7 μm and an angle of repose of 50°. The results are shown in Table 3. Even if three times by mol ratio or higher was used as compared with Examples 1 and 2, the plume could not be extinguished.

TABLE 3

| Amount of sodium carbonate | Analytical value of the $SO_3$ component | Plume length | Plume concentration |
| --- | --- | --- | --- |
| Nil | 17 ppm | About 300 m | (Standard) |
| 0.8 time by mol ratio | 15 ppm | About 300 m | Substantially no change |
| 1.6 times by mol ratio | 10 ppm | About 200 m | About a half of the standard |
| 3.2 times by mol ratio | 8 ppm | About 200 m | About 30% of the standard |

Example 4

Comparative Example

To compare the difference in effects due to the difference in the injection mode of sodium carbonate, an aqueous solution containing 10 mass % of sodium carbonate was prepared, and instead of the sodium carbonate powder, such an aqueous solution was sprayed in the fourth flue 9 (added in a state different from the powder state), and the state at that time was visually observed. The results are shown in Table 4. Even if five times by mol ratio or higher was used as compared with Examples 1 and 2, the plume could not be extinguished.

TABLE 4

| Amount of sodium carbonate | Analytical value of the $SO_3$ component | Plume length | Plume concentration |
| --- | --- | --- | --- |
| Nil | 17 ppm | About 300 m | (Standard) |
| 3 times by mol ratio | 12 ppm | About 300 m | About 70% of the standard |
| 5 times by mol ratio | 12 ppm | About 300 m | About 70% of the standard |

Example 5

The following test was carried out to confirm the effect for improving the flowability and dispersibility of the sodium carbonate powder by the addition of an anti-caking agent or coarse particles and maintaining the dried state during the storage.

With respect to one having nothing added to a sodium carbonate powder pulverized to a mean particle diameter of 7 μm (sample 1), one having 1 mass % of hydrophilic fumed silica added as an anti-caking agent to sodium carbonate (sample 2), one having 20 mass % of coarse particles of sodium carbonate having a mean particle diameter of 105 μm added (sample 3), one having 20 mass % of coarse particles of sodium hydrogencarbonate having a mean particle diameter of 90 μm added (sample 4) and one having 1 mass % of zeolite added as a drying agent and stored for ten days (sample 5), the powder characteristic values were evaluated respectively.

As the above powder characteristic values, the angle of repose as an index of flowability and the dispersion degree as an index of dispersibility, were measured and evaluated. If the angle of repose exceeds 65°, the fluidity tends to deteriorate, and the handling efficiency decreases such that discharge from the silo tends to be difficult. If the dispersion degree is less than 10%, the dispersing state when sprayed in the gas stream tends to deteriorate. The results are shown in Table 5.

TABLE 5

| Additive | Sample 1 | Sample 2 | Sample 3 | Sample 4 | Sample 5 |
| --- | --- | --- | --- | --- | --- |
| Angle of repose (°) | 55 | 51 | 53 | 53 | 53 |
| Dispersion degree (%) | 12 | 48 | 15 | 17 | 20 |
| Discharge time (sec) | 150 | 60 | 100 | 100 | 80 |

In order to confirm the effect for improving the flowability and the dispersibility due to the method of maintaining the dried state during the storage (due to the difference of the packaging material), a case wherein sodium carbonate having 1 mass % of hydrophilic fumed silica added as an anti-caking agent, was stored in a common polyethylene packaging bag having no-dampproofing treatment applied (packaging bag 1), was compared with a case wherein it was packaged in a packaging bag having a dampproofing treatment applied by laminating aluminum on the outside of said polyethylene packaging bag (packaging bag 2) or in a packaging bag having a dampproofing treatment applied by coating vinylidene chloride (packaging bag 3).

As shown in Table 6, 10 kg of each powder was packaged and stored in an atmosphere at a temperature of 30° C. under a relative humidity of 80% for 30 days. Then, the powder characteristic values were measured. The results are shown in Table 6. It is evident that for the improvement of the flowability and dispersibility, it is effective to maintain the dried state by using a dampproofing bag. Here, the damp-proofing bag is a packaging material having a moisture-permeability of at most 5 g/m²/day at 40° C., as stipulated in JIS-Z0208.

TABLE 6

| Anti-caking agent<br>Packaging material | Nil<br>Packaging bag 1 | 1 mass % of hydrophilic silica | | |
|---|---|---|---|---|
| | | Packaging bag 1 | Packaging bag 2 | Packaging bag 3 |
| Moisture permeability (g/m²/day) | 10 | 10 | Less than 0.5 | 4 |
| Angle of repose (°) | 67 | 58 | 52 | 55 |
| Dispersion degree (%) | 4 | 32 | 46 | 42 |

Example 6

A test was carried out in the same manner as in Example 1 using sodium carbonate having a specific surface area of 2.7 m²/g, having the dispersion degree of Table 6 lowered to 32% (1 mass % of hydrophilic fumed silica added; packaging bag 1 was used which is not a dampproofing bag). The results are shown in Table 7. It is evident that with sodium carbonate having moisture adsorbed and the dispersion degree decreased, the effect for preventing a purple smoke decreases even if the average particle diameter is 6 μm. It is considered that this is attributable to the fact that the fine powder of sodium carbonate was injected into the gas to be remained in the agglomerated form, whereby it was not uniformly dispersed and sprayed in the gas.

TABLE 7

| Amount of sodium carbonate | Analytical value of the SO₃ component | Plume length | Plume concentration |
|---|---|---|---|
| Nil | 17 ppm | About 300 m | (Standard) |
| 0.8 time by mol ratio | 12 ppm | About 300 m | About 80% of the standard |
| 1.6 times by mol ratio | 8 ppm | About 200 m | About a half of the standard |
| 3.2 times by mol ratio | 6 ppm | About 100 m | About 30% of the standard |

7

The test was carried out in the same manner as in Example 1 except that in Example 1, porous sodium carbonate was added as it was pulverized, instead of adding, with stirring by air, the mixture having 1.0 mass % of hydrophilic fumed silica having a mean particle diameter of 0.01 μm added to the sodium carbonate powder having a mean particle diameter of 7 μm.

At the time of addition of sodium carbonate, sodium carbonate having a mean particle diameter of 108 μm, an angle of repose of 45° and a specific surface area of 1.1 m²/g (light ash manufactured by ASAHI GLASS CO., LTD) was pulverized to a mean particle diameter of 8.9 μm and a particle diameter at 90% of cumulative undersize distribution is 28 μm, by a high speed impact air classifying mill integrated with a classifier (tradename: ACM Pulverizer 60A, manufactured by Hosokawa Micron Corporation) and was directly injected into the gas as it was, without storing it. At that time, the finely pulverized sodium carbonate was injected into the exhaust gas in such a state that 1 kg of sodium carbonate was dispersed in a draft which generated by pulverizer of 50 Nm³ in a standard state, and the flow rate of the gas stream during the injection was 40 m/sec. Except for these conditions, the operation was carried out in the same manner as in Example 1. And, visual observation of the plume of a purple smoke caused by a sulfuric acid mist discharged from the stack 5, and the quantitative analysis of the SO₃ component in the fourth flue 9, were carried out and evaluated.

TABLE 8

| Amount of sodium carbonate | Analytical value of the SO₃ component | Plume length | Plume concentration |
|---|---|---|---|
| Nil | 17 ppm | About 300 m | (Standard) |
| 0.8 time by mol ratio | 5 ppm | About 200 m | About a half of the standard |
| 1.6 times by mol ratio | 2 ppm | Less than 10 m | Hardly observed |
| 3.2 times by mol ratio | 1 ppm | Not observed | Not observed |

According to the present invention, the SO₃ component in the gas and the sulfuric acid mist derived therefrom can be removed inexpensively, efficiently, simply and safely. Accordingly, the purple smoke, etc. of the exhaust gas discharged from a boiler, etc., can be suppressed. Further, it is significant from the viewpoint of industrial production that removal of the SO₃ component is carried out inexpensively, efficiently, simply and safely also with respect to a gas containing such SO₃ component as an impurity, other than the exhaust gas.

The entire disclosure of Japanese Patent Application No. 2000-145537 filed on May 17, 2000 including specification, claims, drawings and summary are incorporated herein by reference in its entirety.

What is claimed is:

1. A method comprising
   contacting a powder with a gas comprising SO₂ and a SO₃ component to remove the SO₃ component from the gas without removing the SO₂,
   wherein said powder comprises a sodium carbonate powder having a mean particle diameter of at most 20 μm and an anti-caking agent in an amount of from 0.1 to 5 mass % based on the sodium carbonate powder,
   wherein the sodium carbonate powder is present in an amount of from 0.5 to 8 mols per mol of the SO₃ component in the gas,
   wherein the gas is formed by combustion of a fuel comprising sulfur and comprises SO₂ in an amount of at least 500 vol. ppm, and wherein the concentration of the SO₃ component in the gas is reduced to a level of at most 2 vol. ppm as reduced to SO₃ after contact of the gas with the powder.

2. The method according to claim 1, wherein the anti-caking agent has a mean particle diameter of from 0.005 to 5 μm.

3. The method according to claim 1, wherein the anti-caking agent is at least one of a fumed silica or a zeolite.

4. The method according to claim 1, wherein the sodium carbonate powder further comprises coarse particles have a mean particle diameter of 50 μm or greater.

5. The method according to claim 1, wherein the powder is contacted with the gas by adding the powder to the gas.

6. The method according to claim 1, wherein the sodium carbonate is present in an amount of from 2 to 5 mols per mol of the $SO_3$ component.

7. The method according to claim 1, wherein the $SO_3$ component is present in an amount of no greater than 20 vol. ppm and is selectively removed from the gas.

8. A method comprising contacting a powder with a gas comprising a $SO_3$ component to remove the $SO_3$ component from the gas, wherein said powder comprises a sodium carbonate powder having a mean particle diameter of at most 20 μm and coarse particles of at least one of member selected from the group consisting of sodium carbonate and sodium hydrogencarbonate, having a mean particle size of more than 20 μm, in an amount of from 10 to 50 mass % based on said powder.

9. The method according to claim 8, wherein the sodium carbonate powder is present in an amount of from 0.5 to 8 mols per mol of the $SO_3$ component in the gas.

10. The method according to claim 8, wherein the gas is formed by combustion of a fuel comprising sulfur and comprises $SO_2$ in an amount of at least 500 vol. ppm, and wherein the concentration of the $SO_3$ component in the gas is reduced to a level of at most 2 vol. ppm as reduced to $SO_3$ after contact of the gas with the powder.

11. The method according to claim 8, wherein the coarse particles have a mean particle diameter of 50 μm or greater.

12. The method according to claim 8, wherein the powder is contacted with the gas by adding the powder to the gas.

13. The method according to claim 8, wherein the sodium carbonate is present in an amount of from 2 to 5 mols per mol of the $SO_3$ component.

14. A method comprising pulverizing sodium carbonate particles having a mean particle diameter of from 0.05 to 0.5 mm by a dry pulverizer integrated with a pneumatic classifier to form fine particles of sodium carbonate having a mean particle diameter of at most 20 μm, and directly adding the fine particles into a gas comprising a $SO_3$ component as a powder dispersed in a draft generated by the pulverizer to remove the $SO_3$ component from the gas, wherein said powder comprises 50 mass % or more of a sodium carbonate powder.

15. The method according to claim 14, wherein the sodium carbonate powder is present in an amount of from 0.5 to 8 mols per mol of the $SO_3$ component in the gas.

16. The method according to claim 14, wherein the gas is formed by combustion of a fuel comprising sulfur and comprises $SO_2$ in an amount of at least 500 vol. ppm, and wherein the concentration of the $SO_3$ component in the gas is reduced to a level of at most 2 vol. ppm as reduced to $SO_3$ after contact of the gas with the powder.

17. The method according to claim 14, wherein the powder contains coarse particles having a mean particle diameter of 50 μm or greater.

18. The method according to claim 14, wherein the powder is contacted with the gas by adding the powder to the gas.

19. The method according to claim 14, wherein the sodium carbonate is present in an amount of from 2 to 5 mols per mol of the $SO_3$ component.

20. The method according to claim 14, wherein the gas further comprises $SO_2$ and the $SO_3$ component is removed without removing the $SO_2$.

21. A method comprising contacting a powder with a gas comprising $SO_2$ and a $SO_3$ component to remove the $SO_3$ component from the gas without removing the $SO_2$, wherein said powder comprises a sodium carbonate light ash powder having a mean particle diameter of at most 20 μm, wherein the sodium carbonate light ash powder is present in an amount of from 0.5 to 8 mols per mol of the $SO_3$ component in the gas, wherein the gas is formed by combustion of a fuel comprising sulfur and comprises $SO_2$ in an amount of at least 500 vol. ppm, and wherein the concentration of the $SO_3$ component in the gas is reduced to a level of at most 2 vol. ppm as reduced to $SO_3$ after contact of the gas with the powder.

22. The method according to claim 21, wherein the powder further comprises an anti-caking agent.

23. The method according to claim 22, wherein the anti-caking agent has a mean particle diameter of from 0.005 to 5 μm.

24. The method according to claim 21, wherein the anti-caking agent is silica.

25. The method according to claim 21, wherein the sodium carbonate light ash powder further comprises coarse particles have a mean particle diameter of 50 μm or greater.

26. The method according to claim 21, wherein the powder is contacted with the gas by adding the powder to the gas.

27. The method according to claim 21, wherein the sodium carbonate light ash is present in an amount of from 2 to 5 mols per mol of the $SO_3$ component.

* * * * *